United States Patent
Yong

(10) Patent No.: US 8,929,249 B2
(45) Date of Patent: Jan. 6, 2015

(54) SYSTEM AND METHOD FOR VIRTUAL PRIVATE LOCAL AREA NETWORK SERVICE TO USE THE FLOW AWARE PSEUDOWIRE

(75) Inventor: Lucy Yong, McKinney, TX (US)

(73) Assignee: Futurewei Technologies, Inc., Plano, TX (US)

( * ) Notice: Subject to any disclaimer, the term of this patent is extended or adjusted under 35 U.S.C. 154(b) by 148 days.

(21) Appl. No.: 13/224,877

(22) Filed: Sep. 2, 2011

(65) Prior Publication Data

US 2012/0057599 A1    Mar. 8, 2012

Related U.S. Application Data

(60) Provisional application No. 61/380,090, filed on Sep. 3, 2010.

(51) Int. Cl.
| | | |
|---|---|---|
| *H04L 12/28* | (2006.01) | |
| *H04L 12/851* | (2013.01) | |
| *H04L 12/715* | (2013.01) | |
| *H04L 12/723* | (2013.01) | |
| *H04L 12/721* | (2013.01) | |

(52) U.S. Cl.
CPC ............. *H04L 47/2483* (2013.01); *H04L 45/04* (2013.01); *H04L 45/507* (2013.01); *H04L 45/68* (2013.01); *H04L 47/2441* (2013.01)
USPC ........... 370/254; 370/216; 370/230; 370/495; 370/401; 370/385

(58) Field of Classification Search
CPC ... H04L 47/2483; H04L 45/68; H04L 45/507; H04L 45/04
USPC ......... 370/216–230, 238, 249, 385, 395, 401, 370/254
See application file for complete search history.

(56) References Cited

U.S. PATENT DOCUMENTS 7,283,497 B2 * 10/2007 Mueller .......................... 370/331
7,369,556 B1 * 5/2008 Rekhter et al. ................. 370/392
(Continued)

FOREIGN PATENT DOCUMENTS

WO        2011085693 A1     7/2011

OTHER PUBLICATIONS

Bryant, S., Ed., et al., "Flow Aware Transport of Pseudowires Over an MPLS PSN," draft-ietf-pwe3-fat-pw-04, Jul. 9, 2010, 20 pages.

(Continued)

*Primary Examiner* — Ricky Ngo
*Assistant Examiner* — Lan Huong Truong
(74) *Attorney, Agent, or Firm* — Conley Rose, P.C.; Grant Rodolph; William H. Dietrich

(57) ABSTRACT

An apparatus comprising a provider edge (PE) coupled to a second PE and to a customer edge (CE) and configured to establish a Virtual Private Local Area Network (LAN) Service (VPLS) that is interconnected by either a flow aware pseudowire (PW) or a flow unaware PW and exchange a flow label indication with the second PE to enable using a flow label below a PW label on the label stack. Also disclosed is a network component comprising a processor configured to support a signaling protocol that indicates a capability to send, receive, or both a flow label over a PW configured for a Layer Two (Layer 2) Virtual Private Network (VPN), a transmitter configured to send a PW packet with a flow label to a peer network component, and a receiver configured to receive a PW packet either with a flow label or without a flow label.

20 Claims, 8 Drawing Sheets

(56) References Cited

U.S. PATENT DOCUMENTS

| | | | |
|---|---|---|---|
| 7,535,856 B2* | 5/2009 | Booth et al. | 370/255 |
| 7,733,876 B2* | 6/2010 | Davie et al. | 370/395.53 |
| 8,175,078 B2* | 5/2012 | Voit et al. | 370/351 |
| 8,176,201 B1* | 5/2012 | Minei et al. | 709/238 |
| 8,200,839 B1* | 6/2012 | Aysan et al. | 709/238 |
| 8,233,378 B2* | 7/2012 | Srinivasan | 370/216 |
| 8,254,274 B2* | 8/2012 | Kuriakose et al. | 370/248 |
| 8,416,775 B2* | 4/2013 | Kompella | 370/390 |
| 2005/0213513 A1* | 9/2005 | Ngo et al. | 370/254 |
| 2006/0109802 A1* | 5/2006 | Zelig et al. | 370/258 |
| 2006/0272018 A1* | 11/2006 | Fouant | 726/23 |
| 2008/0037526 A1* | 2/2008 | Dong | 370/352 |
| 2010/0040061 A1* | 2/2010 | McGuire et al. | 370/392 |
| 2011/0261812 A1* | 10/2011 | Kini et al. | 370/389 |
| 2012/0113835 A1* | 5/2012 | Alon et al. | 370/252 |
| 2012/0281702 A1* | 11/2012 | Qiu et al. | 370/392 |

OTHER PUBLICATIONS

Bryant, S., Ed., et al., "Flow Aware Transport of Pseudowires Over an MPLS Packet Switched Network," draft-ietf-pwe3-fat-pw-07, Jul. 6, 2011, 21 pages.

Delord, S., et al., "Extension to LDP-VPLS for Ethernet Broadcast and Multicast," draft-delord-l2vpn-lsp-vpls-broadcast-exten-01.txt, May 19, 2010, 15 pages.

Delord, S., et al., "Extension to LDP-VPLS for Ethernet Broadcast and Multicast," draft-delord-l2vpls-broadcast-exten-03.txt, Sep. 28, 2010, 19 pages.

Jounay, F., Ed., et al., "Requirements for Point-to-Multipoint Pseudowire," draft-ietf-pwe3-p2mp-pw-requirements-03.txt, Aug. 18, 2010, 20 pages.

Jounay, F., Ed., et al., "Requirements and Framework for Point-to-Multipoint Pseudowire," draft-ietf-pwe3-p2mp-pw-requirements-04.txt, Jul. 8, 2011, 22 pages.

Sajassi, A., et al., "Routed VPLS Using BGP," draft-sajassi-l2vpn-rvpls-bgp-01.txt, Jul. 7, 2010, 31 pages.

Yong, L., "Flow-Aware Pseudowire for the Virtual Private LAN Service," draft-yong-l2vpn-fat-pw-4-vpls-00.txt, Oct. 8, 2010, 10 pages.

Yong, L., Ed., et al., "Enhanced ECMP and Large Flow Aware Transport," draft-yong-pwe3-enhance-ecmp-lfat-01.txt, Mar. 5, 2010, 16 pages.

Yong, L., Ed., et al., "Large Flow Classification in Flow Aware Transport Over PSN," draft-yong-pwe3-lfc-fat-pw-01.txt, Jul. 11, 2010, 18 pages.

Andersson, L., Ed., et al., "Framework for Layer 2 Virtual Private Networks (L2VPNs)," RFC 4664, Sep. 2006, 44 pages.

Bradner, S., "Key Words for Use in RFCs to Indicate Requirement Levels," RFC 2119, Mar. 1997, 3 pages.

Kompella, K., Ed., et al., "Virtual Private LAN Service (VPLS) Using BGP for Auto-Discovery and Signaling," RFC 4761, Jan. 2007, 28 pages.

Lasserre, M., Ed., et al., "Virtual Private LAN Service (VPLS) Using Label Distribution Protocol (LDP) Signaling," RFC 4762, Jan. 2007, 31 pages.

Martini, L., Ed., et al., "Pseudowire Setup and Maintenance Using the Label Distribution Protocol," RFC 4447, Apr. 2006, 34 pages.

Martini, L., Ed., et al., "Encapsulation Methods for Transport of Ethernet Over MPLS Networks," RFC 4448, Apr. 2006, 25 pages.

Foreign Communication From a Related Counterpart Application, PCT Application PCT/US2011/050353, International Search Report dated Nov. 25, 2011, 5 pages.

Foreign Communication From a Related Counterpart Application, PCT Application PCT/US2011/050353, Written Opinion dated Nov. 25, 2011, 10 pages.

Bradner, "Key Words for Use in RFCs to Indicate Requirement Levels," BCP, RFC 2119, Mar. 1997.

Martini, et al., Encapsulation Methods for Transport of Ethernet Over MPLS Networks, RFC 4448, Apr. 2006.

Kompella, et al., "Virtual Private LAN Service (VPLS) Using BGP for Auto-Discovery and Signaling" RFC 4761, Jan. 2007.

Lasserre, et al., "Virtual Private LAN Service (VPLS) Using Label Distribution Protocol (LDP) Signaling," RFC 4762, Jan. 2007.

Andersson, et al., "Framework for Layer 2 Virtual Private Networks (L2VPNs)," RFC 4664, 2006.

Bryant, Ed., et al., "Flow Aware Transport of Pseudowires Over an MPLS PSN," draft-ietf-pwe3-fat-pw-04.txt, Jul. 9, 2010, 20 pages.

Jounay, Ed., et al., "Requirements for Point-to-Multipoint Pseudowire," draft-ietf-pwe3-p2mp-pw-requirements-03.txt, Aug. 18, 2010, 20 pages.

Delord, et al., "Extension to LDP-VPLS for Ethernet Broadcast and Multicast," draft-delord-l2vpn-ldp-vpls-broadcast-exten-01.txt, May 19, 2010, 15 pages.

Foreign Communication From A Counterpart Application, European Application No. 11755220.8, European Office Action dated Oct. 9, 2014, 5 pages.

"Virtual Private LAN Service," XP055143784, Retrieved from the Internet: URL: https://web.archive.org/ web/20100524231636/ http://en.wikipedia.org/wiki/virtural_Private_LAN_Service, May 24, 2010, 5 pages.

* cited by examiner

SYSTEM AND METHOD FOR VIRTUAL PRIVATE LOCAL AREA NETWORK SERVICE TO USE THE FLOW AWARE PSEUDOWIRE

CROSS-REFERENCE TO RELATED APPLICATIONS

The present application claims the benefit of U.S. Provisional Patent Application No. 61/380,090 filed Sep. 3, 2010 by Lucy Yong and entitled "System and Method for Virtual Private Local Area Network Service (VPLS) to Use the Flow Aware Pseudowire," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames from one node to another node across the network without using pre-configured routes on intermediate nodes. Other networks may forward the data frames from one node to another node across the network along pre-configured or pre-established paths. In some networks, a plurality of traffic flows or streams can be distributed and forwarded over a group of paths that are coupled to a same destination node or next hop. For example, Internet Protocol (IP) and/or Multiprotocol Label Switching (MPLS) networks can use equal cost multi-path (ECMP) or Link Aggregation Group (LAG) schemes to send multiple flows to the same destination or next hop over a plurality of aggregated links or paths.

SUMMARY

In one embodiment, the disclosure includes an apparatus comprising a provider edge (PE) coupled to a second PE and to a customer edge (CE) and configured to establish a Virtual Private Local Area Network (LAN) Service (VPLS) that is interconnected by either a flow aware pseudowire (PW) or a flow unaware PW and exchange a flow label indication with the second PE to enable using a flow label below a PW label on the label stack.

In another embodiment, the disclosure includes a network component comprising a processor configured to support a signaling protocol that indicates a capability to send, receive, or both a flow label over a PW configured for a Layer Two (Layer 2) Virtual Private Network (VPN), a transmitter configured to send a PW packet with a flow label to a peer network component, and a receiver configured to receive a PW packet either with a flow label or without a flow label.

In a third aspect, the disclosure includes a method implemented by at least one network component, comprising setting a flow label indication, sending a message that indicates a capability to send a pseudowire (PW) packet with a flow label to a peer, and receiving a second message that indicates the peer's capability to send a PW packet with a flow label.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Layer 2 VPN framework is described in Internet Engineering Task Force (IETF) Request for Comments (RFC) 4664, which is incorporated herein by reference. The Layer 2 VPN framework may use a point-to-point (p2p) PW between a pair of PEs, which may be network edge nodes, for service demultiplexing. Each p2p PW may be mapped to a Traffic Engineering (TE) tunnel or non-TE tunnel that may traverse through a packet switched network. The services that may be implemented Layer 2 VPN may include a Virtual Private Wire Service (VPWS) and a VPLS, as described in RFC 4664. VPWS may be a p2p transport service and VPLS may be a multi-point emulated LAN service. Two VPLS schemes may be implemented: a border gateway protocol (BGP) based auto discovery and signaling scheme and a link distribution protocol (LDP) based signaling scheme, e.g., as described in RFC 4761 and RFC 4762, respectively, both of which are incorporated herein by reference.

A flow aware transport for PW (FAT-PW) is described by S. Bryan et al. in the draft-ietf-pwe3-fat-pw-04 entitled "Flow Aware Transport of Pseudowire over an MPLS PSN", which is incorporated herein by reference. The flow aware transport may add a flow label on a label stack and enable one or more flows within a PW to be distinguished and carried over an ECMP and/or LAG in a packet switched network (PSN). The target application of the PW with flow label may be to transport substantially large volumes of IP traffic between routers (at two locations). Typically, VPWS may be implemented to serve this purpose.

In other cases, Service Providers (SPs) may use VPLS to provide an emulated LAN service and to transport customer Layer 2 frames among CEs, which may be coupled to the PEs. Some Layer 2 VPN services may carry Layer 2 frames that comprise IP payloads. In such cases, it may also be useful or advantageous for a SP to use PW with a flow label in VPLS. Disclosed herein is a system and methods for using PW with flow label in VPLS. The system and methods may comprise protocol extension for provisioning the PW. The PW may be used in the VPLS for demuliplexing a service instance between a pair of PEs, which may be transported over multiple network paths. The PW packets with flow labels may be transported over a single path or multiple paths.

Figure 1:
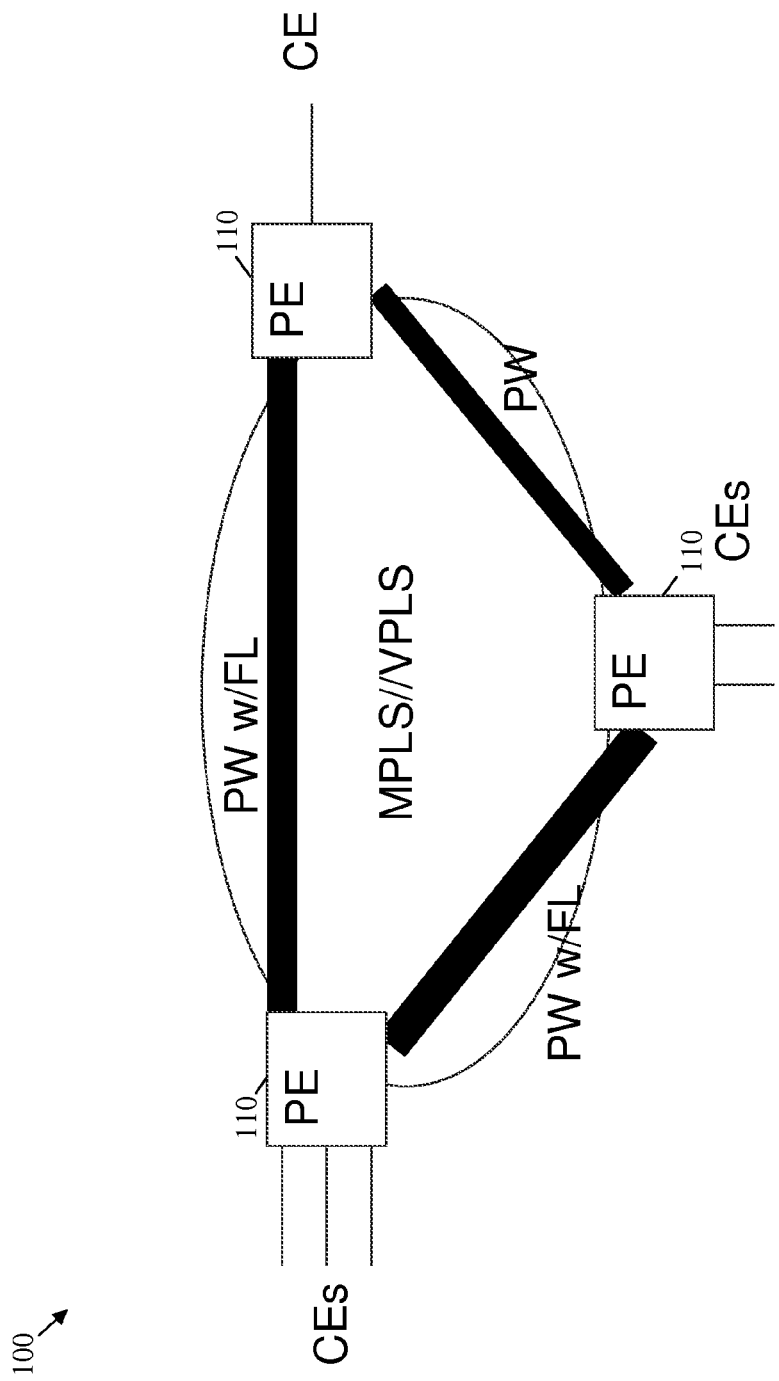
FIG. 1 is a schematic diagram of one embodiment of a flow forwarding system in a network.

FIG. 1 illustrates an embodiment of a flow forwarding system in a network 100. The network 100 may comprise a plurality of nodes including a plurality of edge nodes or PEs 110. The PEs 110 may be coupled to a plurality of CEs and may be configured to transport data, e.g., frames or packets, between the network 100 and the CEs. The network 100 may be any network configured to transfer data, e.g., using frames or packets. For instance, the network 100 may be a core network or an access network based on one or more transport technologies, including IP, MPLS, Ethernet, other technologies or protocols, or combinations thereof.

The PEs 110 may be any devices or components that exchange data in the network 100 and with the CEs, such as routers, switches, and/or bridges. For instance, the PEs 110 may include provider core bridges (PCBs) and/or provider edge bridges (PEBs). The PEs 110 may implement one or more protocols, including MPLS, BGP, and/or LDP. In embodiments, the PEs 110 may reside at the edge of or interface with devices that reside at the edge of a network provider's domain. The CEs may be any devices or components that exchange data with the PEs 110. For instance the CEs may be any customer devices, such as customer distribution points and/or personal user devices, including fixed and/or mobile devices. Alternatively, the CEs may be network nodes, e.g., routers, bridges, and/or switches, located in customer networks or domains that are coupled to the network 100.

The PEs 110 may also be configured to establish PW between one another to transfer data flows across or through the network 100. The PWs may comprise Layer 2 VPN p2p PWs, multiple paths (multi-point-to-multi-point) PWs, or both. The multiple paths PWs may be established using ECMP and/or LAG links between the PEs 110. The PWs between the PEs 110 may also be configured to establish a Layer 2 VPLS, e.g., across the network 100. For instance, the VPLS may be used to emulate a LAN across a wide area network (WAN). The VPLS may be a multipoint service that transfers data on a plurality of paths between the PEs 110. The VPLS frames exchanged between the PEs 110 may be Ethernet frames, which may be forwarded based on destination Media Access Control (MAC) address. The frames payloads may comprise IP data that are exchanged with the CEs, which may be routers.

In an embodiment, the VPLS may be established and configured between the PEs 110 using BGP signaling, e.g., as described in RFC 4761, which is incorporated herein by reference. The RFC 4761 describes BGP based auto-discovery and signaling for VPLS configuration and operation procedures. Alternatively, the VPLS may be established and configured between the PEs 110 using LDP signaling, e.g., as described in RFC 4762, which is incorporated herein by reference. The RFC 4762 describes LDP based VPLS configuration and operation procedures. Both the BGP and LDP may implement PWs without flow labels (wo/fl) to support a VPLS instance. Additionally, the network 100 and/or the PEs 110 may be configured to extend BGP, LDP, or both, for provisioning PWs with flow labels (w/fl) in a VPLS instance. A VPLS instance that uses flow labels on PW packets may receive different treatments i.e., may be handled differently in a PSN than another VPLS instance that does not use flow labels on PW.

Figure 2:
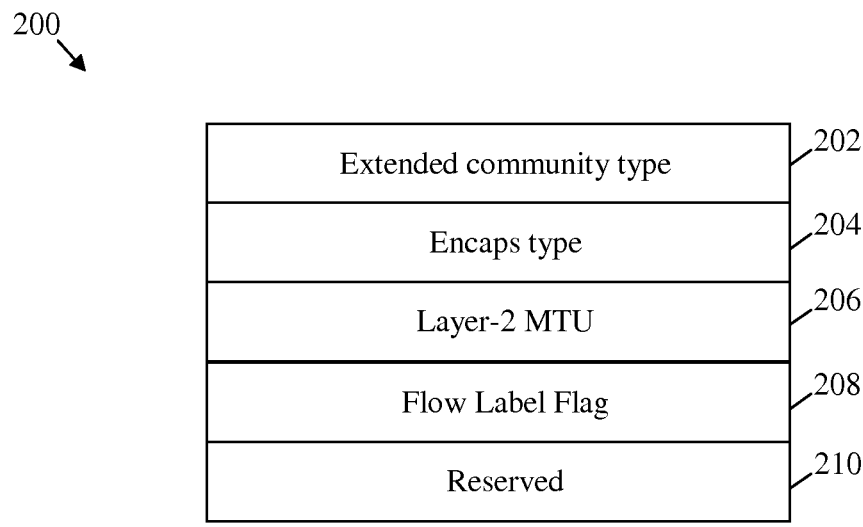
FIG. 2 is a schematic diagram of an embodiment of a Layer Two message for indicating a flow label.

FIG. 2 illustrates an embodiment of a Layer 2 message 200 for indicating a flow label. The Layer 2 message 200 may be used in BGP signaling to configure a PW between a pair of PEs in a VPLS instance. BGP signaling may be used in a BGP discovery protocol to learn about PEs in an VPLS instance, e.g., as described in RFC 4761. In BGP discovery protocol, VPLS BGP Network Layer Reachability Information (NLRI) may be sent to exchange VPLS membership and demultiplexors. The Layer 2 message 200, also referred to as "Layer 2 Info Extended Community" may be used to signal control information about PW, e.g., to set up the PW for a VPLS router (VE) or PE. The Layer 2 message 200 may be sent by a PE to configure or set up the associated PW (for a VPLS) with a flow label. The Layer 2 message 200 may be one of the attributes for Network Layer Reachability Information (NLRI), where PW label information may be encoded.

The Layer 2 message 200 may comprise an extended community type 202 (e.g., that is equal to about two octets in size), an encapsulation (encaps) type 204 (e.g., that is equal to about one octet in size), a layer 2 maximum transmission unit (MTU) 206 (e.g., that is equal to about two octets in size), and a reserved field 210 (e.g., that is equal to about one octet in size). The values or fields above may be configured as described in RFC 4761. Additionally, the Layer 2 message 200 may comprise a flow label flag field 208 that may be added to extend BGP and signaling to configure the PW with a flow label. The flow label flag field 208 may have a size of about one octet.

Figure 3:
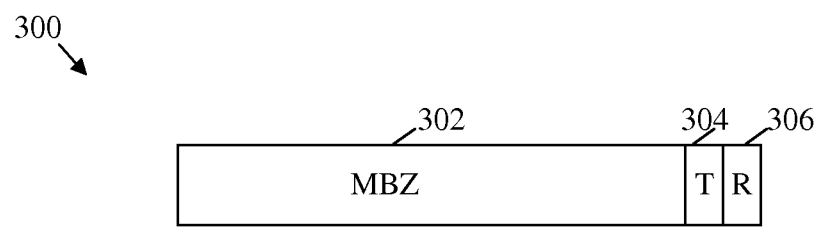
FIG. 3 is a schematic diagram of an embodiment of a flow label flag.

FIG. 3 illustrates an embodiment of a flow label flag attribute 300 that corresponds to the flow label flag field 208. The flow label flag attribute 300 may comprise a plurality of flags, including a Transmit enable flow label (T) flag 304 and a Receive enable flow label (R) flag 306. The T flag 304 and the R flag 306 may be one bit flags. The flow label flag attribute 300 may also comprise a must be zero (MBZ) field 302, which may comprise about six bits that are set to about zero. The T flag 304 may be set to about one, e.g., by the sending PE, to request for the PE the ability to send a PW packet that includes a flow label. Alternatively, the T flag 304 may be set to about zero to indicate that the PE may not send a PW packet comprising a flow label. The R flag 306 may be set to about one, e.g., by the sending PE, to indicate that the PE is able to receive a PW packet with a flow label in the packet. Alternatively, the R flag 306 may be set to about zero to indicate that the PE is unable to receive a PW packet with a flow label in the packet.

The flow Label flag attribute 300 may be used to synchronize the flow label state between the ingress and egress PEs. In an embodiment, the absence of a flow label flag attribute or field in the message (e.g., Layer 2 message 200) may indicate that the PE is unable to process flow labels. A PE that uses BGP signaling and does not send a flow label flag should not include a flow label in the sent PW packet. A PE that uses BGP signaling and does not receive a flow label flag from its peer PE should process the PW packet as it is without flow label.

This scheme may preserve backwards compatibility with existing PW specifications or protocols. When the PW's ingress PE signals the capability to insert flow label and the egress PE signals the capability to process the packet with flow label, the ingress PE may decide to put a flow label on the packets or not. Thus, the egress PE with flow label capability should check the bottom of stack (BOS) bit on the PW label of a receiving packet. If the BOS bit of the PW is not set, then a flow label may be encoded in the packet. The PE may strip both the PW label and the flow label off. If the BOS bit of the PW is set, then a flow label is not encoded in the packet. The PE may just strip off the PW label.

A PE that sends a flow label flag with T set to about one to a peer PE and receives another flow label flag with R set to about one from the peer PE may include a flow label in the PW packet. A PE that sends a flow label flag with R set to about one to a peer and receives another flow label flag with T set to about one from the peer may strip off both PW label and flow label on the packets (from the network or other PEs) before forwarding the packets to coupled CEs. Under other transmission/reception combinations of flow label flag in signaling, a PE may not include a flow label in the PW packet.

In embodiments, the signaling process may allow some PWs in a VPLS instance to use a flow label on pseudowire packets and other PWs in the same VPLS instance not to use flow labels. Such implementation may provide the flexibility to support network migration. If signaling, e.g., according to RFC 4761, is not used for a PW, then whether the flow label is used or not may be similarly provisioned in both PEs at the PW endpoints. If there is no provisioning support for this flow label option, the default behavior may be to not include the flow label. In the embodiments above, the PE may signal the desire to include the flow label in the label stack, e.g., as specified in FAT-PW. The value of the label may be handled locally at the ingress PE, and the label value itself may not be signaled. The PW forwarder (e.g., PE) may follow the procedure described in section 3 in FAT-PW.

Figure 4:
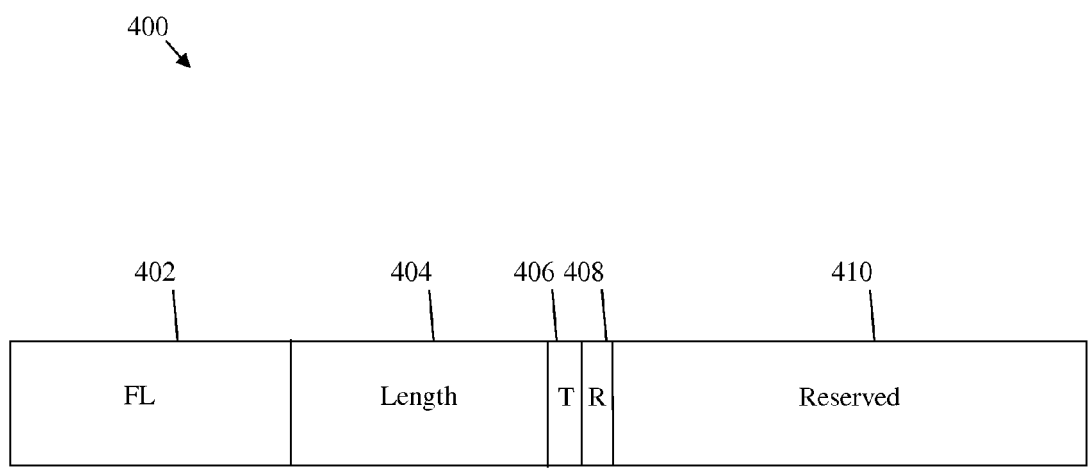
FIG. 4 is a schematic diagram of an embodiment of a flow label Type-Length-Value (TLV).

FIG. 4 illustrates an embodiment of a flow label TLV (or sub-TLV) 400 for indicating a flow label. The flow label TLV 400 may be used in LDP signaling to configure a PW between a pair of PEs in a VPLS instance. LDP signaling may be used to provision a VPLS instance and configure an Ethernet PW, e.g., as described in RFC 4448 incorporated herein by reference, between multiple pairs of PEs, which may form a mesh topology among the PEs. To form a mesh topology only among the PEs associated with a VPLS instance, a network operator may first use BGP auto discovery to find the PEs associated with a VPLS instance and then use LDP to provision Ethernet PWs between the PEs. The flow label TLV 400 may be sent by a PE to configure or set up the associated PW (in a VPLS instance) with a flow label.

The flow label TLV 400 may comprise a flow label field 402 (e.g., that has a size of about one octet), a length field 404 (e.g., that has a size of about one octet), and a reserved field 410 (e.g., that has a size of about 14 bits). Additionally, the flow label TLV 400 may comprise a T flag 406 and an R flag 408. The T flag 406 and the R flag 408 may be one bit flags. The values or fields above may be configured as described in FAT-PW. The flow label field 302 may indicate a flow label value, the length 404 may indicate the length of the flow label TLV 400, and the reserved field 410 may not be used. The T flag 406 may be set to about one, e.g., by the sending PE, to request for the PE the ability to send a PW packet that includes a flow label. Alternatively, the T flag 406 may be set to about zero to indicate that the PE may not send a PW packet comprising a flow label. The R flag 408 may be set to about one, e.g., by the sending PE, to indicate that the PE is able to receive a PW packet with a flow label in the packet. Alternatively, the R flag 408 may be set to about zero to indicate that the PE is unable to receive a PW packet with a flow label in the packet.

The absence of the flow label TLV (or sub-TLV) 400 in a sent interface parameter or message (by the PE) may indicate that the PE is unable to process flow labels. A PE that uses LDP signaling and does not send a flow label TLV 400 may not include a flow label in the sent PW packets. A PE that uses LDP signaling and does not receive a flow label TLV 400 from its peer PE may not include a flow label in the PW packets. This scheme may preserve backwards compatibility with existing PW specifications.

A PE that sends a flow label TLV or sub-TLV with T set to about one to a peer PE and receives a flow label TLV or sub-TLV with R set to about one from the peer PE may include a flow label in the PW packet. A PE that sends a flow label TLV or sub-TLV with R set to about one to a peer and receives a flow label TLV or sub-TLV with T set to about one from the peer may strip off both a PW label and a flow label on the packets before forwarding them to CEs. Under other transmission/reception combinations of flow label TLV or sub-TLV in LDP signaling, a PE may not include a flow label in the PW packet. If LDP signaling, e.g. based on RFC 4762, is not in use for pseudowire setup, then whether the flow label is used or not may be similarly provisioned in both PEs at the PW endpoints. If there is no provisioning support for this flow label option, the default behavior may be not to include the flow label. Data forwarding on an Ethernet PW may follow the procedures described in RFC 4762.

In an embodiment, a VPLS may form a mesh among a plurality of PEs in a network. As such, each virtual switching instance (VSI) at each of the PEs for the VPLS may have a p2p PW to other VSIs (at other PEs) in the same VPLS. MAC address learning may be used per each PW association (between a pair of PEs), where a forward information base (FIB), e.g., at the PEs, may maintain mapping between customer MAC address and PW association. When a PW with a flow label is configured for the VPLS, the PW may still appear as a single PW to the VSI. As such, the VSI forwarder function (at a PE) may be substantially similar to the VSI forwarder function in the case of using the PW without flow label, e.g., as described in RFC 4762.

In the case where ECMP is used at the PEs, an ingress PE may distribute PW packets with flow labels to different tunnels and an egress PE may receive the packets from different tunnels. The packets distribution method may be handled locally by the PEs. The VSI forwarder may be able to generate flow label and process PW encapsulation as described in Section 3.1 of FAT-PW. The VSI forwarder may also implement flow recognition as described in section 3.2.4. In some cases, the VPLS may use point-to-multi-point (P2MP) PW for traffic optimization, e.g., as described by F. Jounay et al. in the draft-ietf-pwe3-p2 mp-pw-requirements-02.txt (work in progress) entitled "Requirements for Point to Multipoint Pseudowire", and by S. Delord et al. in the draft-delord-12vpn-ldp-vpls-broadcast-exten-01-txt (work in progress) entitled "Extension to LDP-VPLS for Ethernet Broadcast and Multicast," both of which are incorporated herein by reference. The P2MP PW with flow label may require the egress points to be able to process flow labels, which may make it difficult to synchronize a decision. In some cases, it may be preferable to use PW without flow label for P2MP PW.

As described above, the VPLS service may transport customer Ethernet frames. When using PW with flow label, the VPLS may require that the ingress PE identifies a flow or a group of flows within the service. This may be achieved by parsing the ingress Ethernet traffic (e.g., on the network side) and considering all or some of the IP traffic (e.g., on the customer side). The source and destination IP addresses, source and destination ports, protocol type, or combinations thereof may be used to identify the flow. Whether the ingress PE uses a PE bridge element or a VSI forwarder to recognize the flow may be an aspect of local implementation at the PE.

Figure 5A:
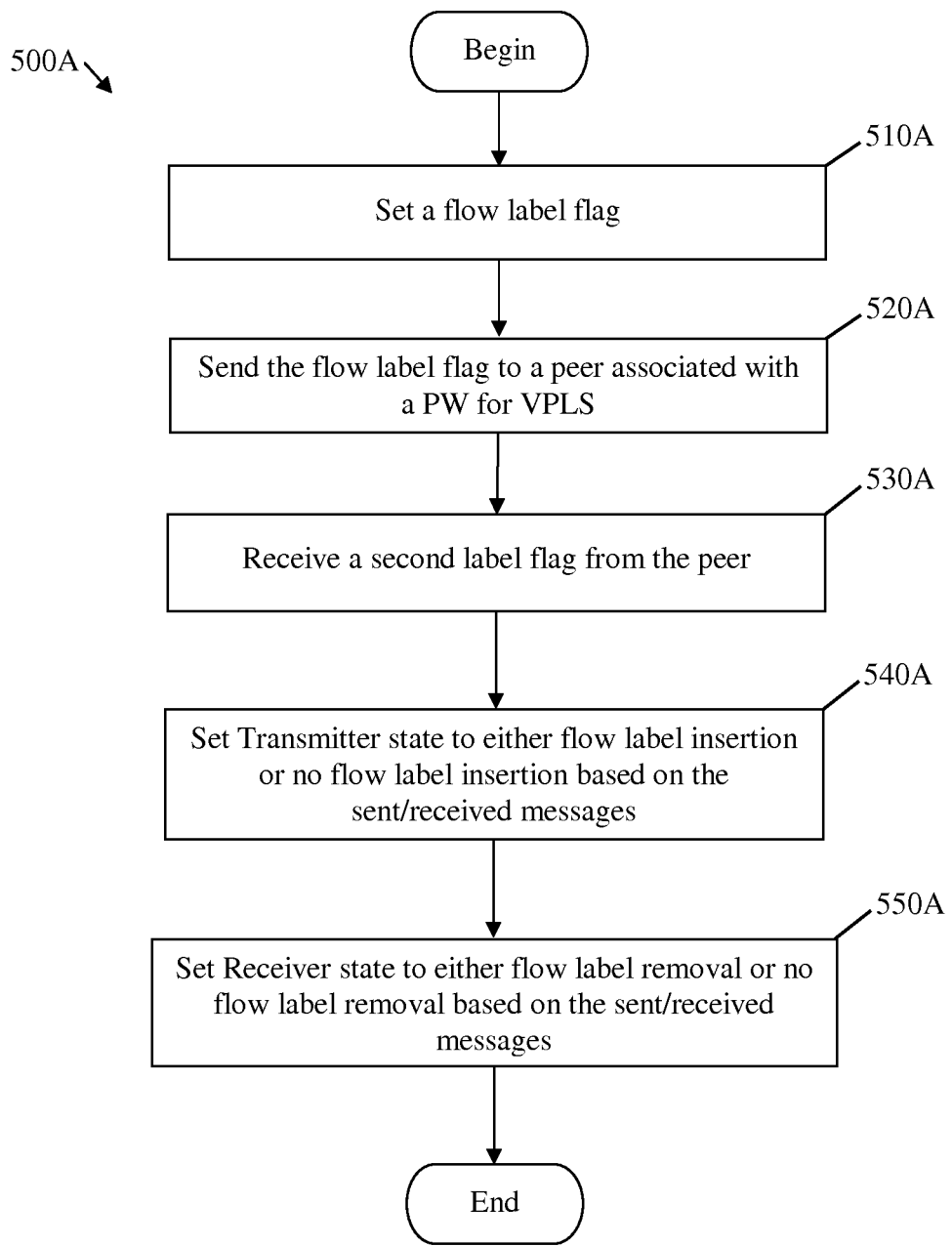
FIG. 5A is a flowchart of an embodiment of a pseudowire signaling and configuration method.

FIG. 5A illustrates an embodiment of a pseudowire signaling and configuration method 500. The pseudowire signaling and configuration method 500A may be used to configure a PW (between a pair of PEs) for a VPLS to carry a flow label. The flow label may be used to identify and differentiate a flow from a plurality of flows that may be transported via an ECMP or a LAG, e.g., in a PSN. The pseudowire signaling and configuration method 500A may be implemented by one or a plurality of PEs that implement VPLS.

The method 500A may begin at block 510A, where a flow label flag may be set. The flow label flag may be a flow label flag attribute in a Layer 2 Info Extended Community message (e.g., Layer 2 message 200) based on BGP or a flow label sub-TLV (e.g., flow flag TLV 400) based on LDP. A T flag, an R flag, or both may be set by a PE to indicate whether the PE may send, receive, or both a flow label on the PW. At block 520A, the flow label may be sent to a peer associated with a PW for VPLS. For instance, the Layer 2 Info Extended Community message or the flow label sub-TLV may be sent from an ingress PE to an egress PE associated with the PW at the VPLS. At block 530A, a second flow label flag may be received from the peer. The second flow label flag may be received in a second Layer 2 Info Extended Community message or a second flow label sub-TLV that may be sent from the egress PE to the ingress PE. A second T flag, a second R flag, or both may be set by the egress PE to indicate whether the egress PE may send, receive, or both a flow label on the PW. At block 540A, transmitter state (at ingress PE) may be set to either flow label insertion enabled or no flow label insertion enabled, based on the sent message (e.g., if the sent flow label flag was set). At block 550A, receiver state (at ingress PE) may be set to either flow label removal enabled or no flow label removal enabled, based on the received message (e.g., if the received second flow label flag from the peer was set). The method 500 may then end.

Figure 5B:
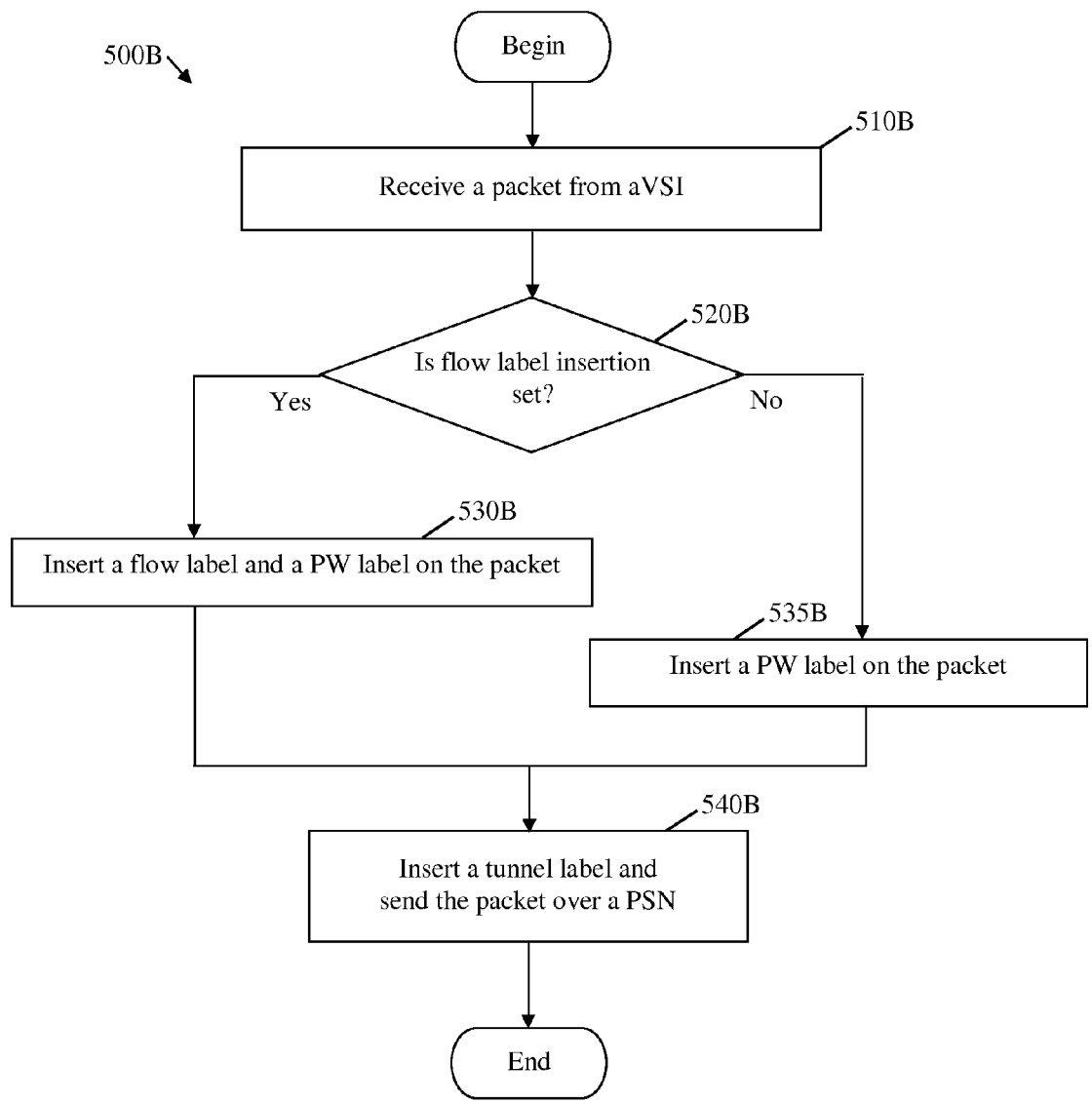
FIG. 5B is a flowchart of an embodiment of a pseudowire flow label insertion method.

FIG. 5B illustrates an embodiment of a pseudowire flow label insertion method 500B that may be used to insert a flow label for a PW. The method 500B may begin at block 510B, where a packet may be received from a VSI. The packet may be received at a PE coupled via the VSI. At block 520B, the method 500B may determine if flow label insertion is set. If flow label insertion is set (e.g., as described in method 500A), then the method 500B may proceed to block 530B. Otherwise, the method 500B may proceed to block 535B. At block 530B, a flow label and a PW label may be inserted on the packet. At block 535B, a PW label (but not a flow label) may be inserted on the packet. At block 540B, a tunnel label may be inserted (on the packet) and the packet may be sent over a PSN. The method 500B may then end.

Figure 5C:
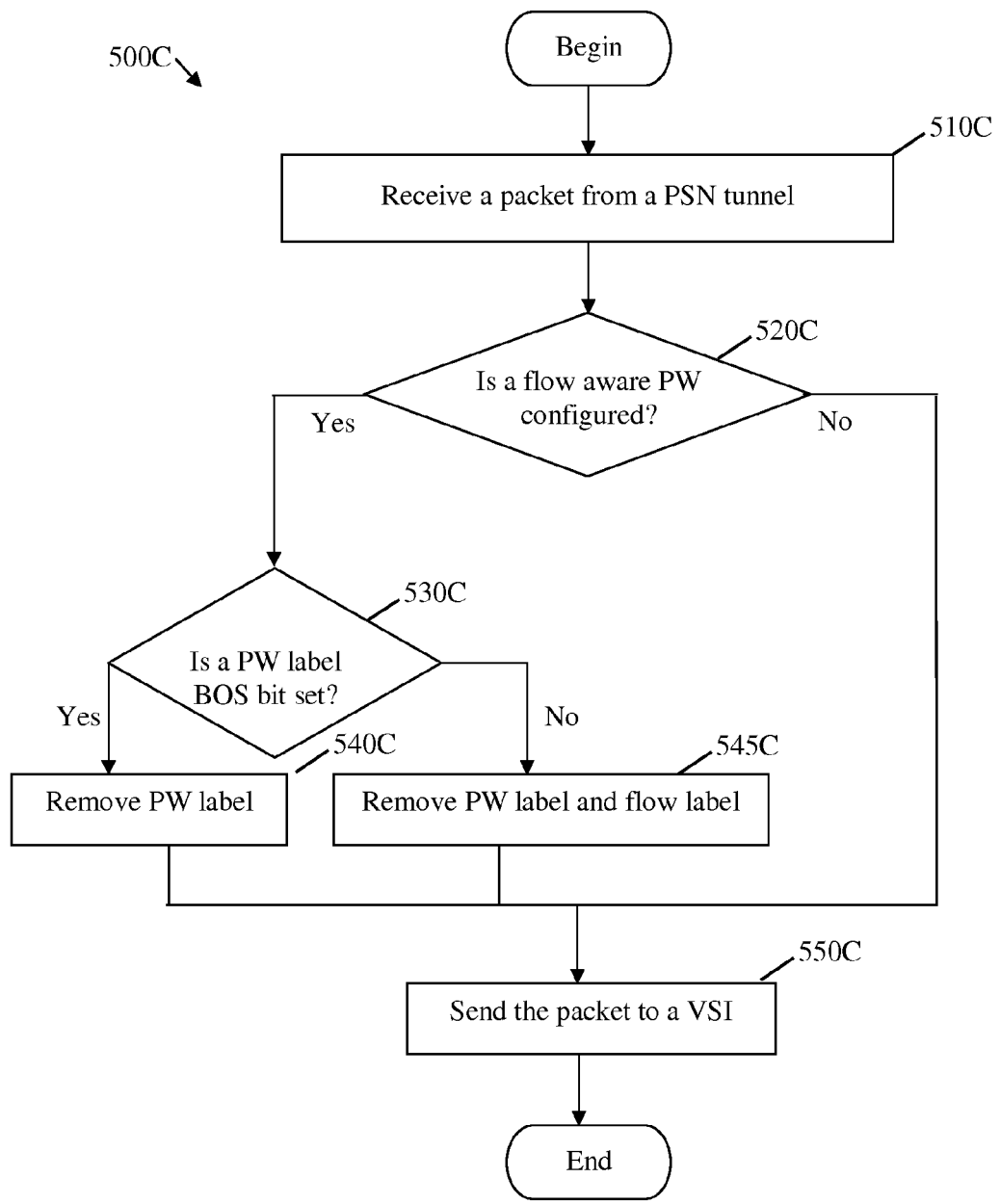
FIG. 5C is a schematic diagram of an embodiment of a pseudowire flow label removal method.

FIG. 5C illustrates an embodiment of a pseudowire flow label removal method 500C that may be used to remove a flow label for a PW. The method 500C may begin at block 510C, where a packet may be received from a PSN tunnel. The packet may be received at a PE coupled via the PSN tunnel. At block 520C, the method 500C may determine if a flow aware PW (at the PE) is configured. If a flow aware PW is configured, then the method 500C may proceed to block 530C. Otherwise, the method 500B may proceed to block 550C. At block 530C, the method 500C may determine if a PW label BOS bit is set. If the PW label BOS bit is set, then the method 500C may proceed to block 540C. Otherwise, the method 500C may proceed to block 545C. At block 540C, a PW label may be removed (from the received packet). At block 545C, a PW label and a flow label may be removed from the packet. At block 550C, the packet may be sent to a VSI. The method 500C may then end.

Figure 6:
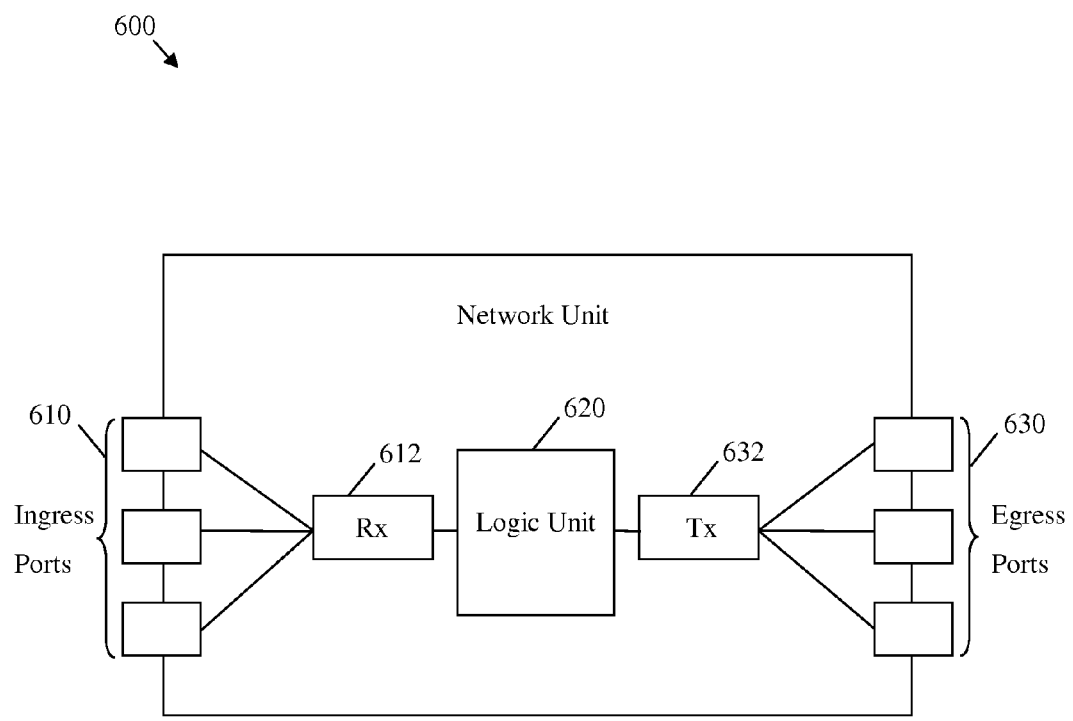
FIG. 6 is a schematic diagram of an embodiment of a network unit.

FIG. 6 illustrates an embodiment of a network unit 600, which may be any device that transports and processes data through the network. For instance, the network unit 900 may correspond to or may be located at a PE associated with a PW in a VPLS. The network unit 600 may comprise one or more ingress ports or units 610 coupled to a receiver (Rx) 612 for receiving signals and frames/data from other network components. The network unit 600 may comprise a logic unit 620 to determine which network components to send data to. The logic unit 620 may be implemented using hardware, software, or both. The network unit 600 may also comprise one or more egress ports or units 630 coupled to a transmitter (Tx) 632 for transmitting signals and frames/data to the other network components. The receiver 612, logic unit 620, and transmitter 632 may also implement or support the pseudowire signaling and configuration method 500 and the signaling schemes or protocols described above. The components of the network unit 600 may be arranged as shown in FIG. 6.

Figure 7:
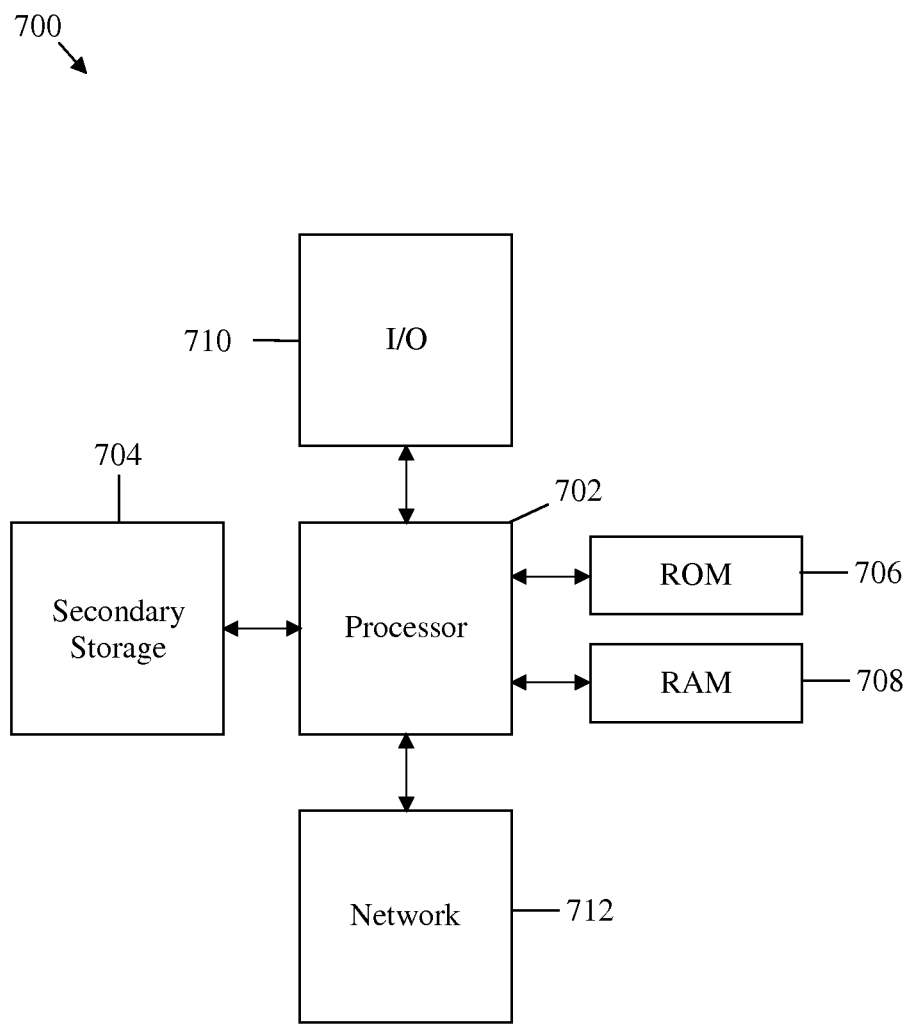
FIG. 7 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 11 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 110 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 110 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a provider edge (PE) coupled to a second PE and to a customer edge (CE), wherein the PE is configured to:
establish a Virtual Private Local Area Network (LAN) Service (VPLS) that interconnects the PE with the second PE via a pseudowire (PW) that comprises a plurality of paths;
set one or more flags within a flow label indication when the PE is configured to support exchanging a plurality of data packets that each comprise a flow label via the PW;
transmit the flow label indication to the second PE, the flow label indication indicating to the second PE that the PE is requesting to send the data packets with the flow label;
receive a second flow label indication from the second PE, the second flow label indication indicating to the PE that the second PE is able to receive the data packets with the flow label;
attach the flow labels to the data packets when the second flow label indication comprises one or more second flags that are set to indicate the second PE is configured to support exchanging the data packet with the flow labels via the PW; and
transmit the data packets with the flow labels,
wherein the flow label is used to route the data packets via the paths, and
wherein the flags indicate whether the PE is configured to support exchanging the data packets with the flow labels via the PW.

2. The apparatus of claim 1, wherein the flow label indication is exchanged using at least one of the following: a border gateway protocol (BGP) message that provisions flow aware transport for PW (FAT-PW) for VPLS and a link distribution protocol (LDP) signaling for FAT-PW.

3. The apparatus of claim 1, wherein the flow label is used to identify a corresponding flow transported using an equal cost multi-path (ECMP) scheme, and wherein the flow label is assigned different values for each of the paths within the PW.

4. The apparatus of claim 1, wherein the flow label is used to identify a corresponding flow transported using a Link Aggregation Group (LAG) scheme, wherein the flow label is located below a PW label and above a tunnel label of a label stack, and wherein the PE is configured to transmit a data packet without the flow labels when none of the flags are set.

5. The apparatus of claim 1, wherein the second flow label indication comprises a transmit flag and a receive flag, wherein the second flow label indication indicates that the second PE is unable to support exchanging the data packets with the flow labels via the PW when the transmit flag and the receive flag are not set, and wherein the second flow label indication is received in response to transmitting the flow label indication to the second PE.

6. The apparatus of claim 1, wherein one of the flags is a transmit flag, wherein the second flow label indication comprises a receive flag, and wherein the PE is further configured to transmit the data packets with the flow labels to the second PE via the PW when the transmit flag and the receive flag are set.

7. The apparatus of claim 1, wherein the PE is configured to not attach the flow labels to the data packets when the PE does not receive the second flow label indication, and wherein the PE is configured to not attach the flow labels to the data packets when the one or more second flags are not set.

8. A network component comprising:
a receiver configured to receive a flow label indication;
a processor coupled to the receiver, wherein the processor is configured to:
set a first flag and a second flag located within a Layer Two (Layer 2) message, wherein the first flag and the second flag are used to determine whether the network component is capable of supporting one or more flow labels transported over a pseudowire (PW) configured for a Layer 2 Virtual Private Network (VPN); and
insert one of the flow labels onto a PW packet in response to receiving the flow label indication that comprises a third flag that is set to indicate a peer network component supports the flow label; and a transmitter coupled to the processor, wherein the transmitter is configured to send the PW packet with the flow label to the peer network component when the first flag is set to indicate that the network component is configured to transmit the PW packet with the flow label via the PW, wherein the one of the flow labels is used to transport the PW packet over a data flow within the PW, wherein one of the first flag and the second flag indicates to the peer network component that the network component is requesting to send the PW packet with the flow label, and the third flag indicates to the network component that the peer network component is able to receive the PW packet with the flow label.

9. The network component of claim 8, wherein a signaling protocol uses border gateway protocol (BGP), wherein the Layer 2 message is a Layer 2 Info Extended Community attribute, and wherein the flow label indication is added in the Layer 2 Info Extended Community attribute that comprises an extended community type, an encapsulation, a plurality of control flags, a Layer 2 maximum transmission unit (MTU), and a flow label indication attribute.

10. The network component of claim 9, wherein the flow label indication attribute comprises the first flag, the second flag, and a must be zero (MBZ) field, and wherein the PW packet and the second PW packet are not transported over the PW when the first flag and the second flag are not set.

11. The network component of claim 8, wherein a signaling protocol uses link distribution protocol (LDP), wherein the Layer 2 message is a flow label Type-Length-Value (TLV), and wherein the flow label TLV is used for the flow label indication and comprises a flow label field, a length field, the first flag that represents a transmit enable flow label flag, and the second flag that represents a receive enable flow label flag.

12. The network component of claim 8, wherein the receiver is configured to receive a second PW packet with the flow label when the second flag is set to indicate that the network component is configured to receive the second PW packet with the flow label via the PW, and wherein the processor is further configured to not insert the flow label with the second PW packet in response to receiving the flow label indication that comprises the third flag that is not set.

13. A method, comprising:
setting a flow label flag within a message when a network component is configured to send, receive, or both, a plurality of flow labels via a pseudowire (PW);
receiving a second message that comprises a second flow label flag from a peer;
attaching the flow labels to a plurality of PW packets based upon a determination that the second flow label flag is set to indicate that the peer is capable of receiving PW packets with the flow labels; and
transmitting the PW packets via the PW in response to receiving the second message,
wherein the flow labels are used to route the plurality of PW packets via a plurality of paths within the PW,
wherein the flow label flag is set to indicate to the peer that the network component is capable of sending the PW packets via the PW and that the network component is requesting to send the PW packets via the PW, and
wherein the second flow label flag indicates to the network component that the peer is able to receive the PW packets via the PW.

14. The method of claim 13, wherein the network component comprises a virtual switching instance (VSI) that is coupled to another VSI located at the peer via the PW, and wherein the VSI is used to forward the PW packets with the flow label via the PW and forward other data traffic that does not use the flow label via the PW.

15. The method of claim 13, wherein border gateway protocol (BGP) or link distribution protocol (LDP) signaling is used to indicate a capability to send, receive, or both the flow label over the PW, and wherein the PW is configured for a Layer Two (Layer 2) Virtual Private Network (VPN).

16. The method of claim 13, further comprising receiving a third message that comprises a third flow label flag, wherein the third flow label flag indicates that a second peer is configured to receive data packets without the flow label over a second PW.

17. The method of claim 13, further comprising indicating an inability to send, receive, or both the PW packets with the flow label over the PW by not setting the flow label flag in the message, wherein the flow labels determine which paths within the PW the PW packets are transported over, and wherein the PW packets are not attached with the flow label with the PW packets when the second flow label flag is not set to indicate the peer's capability to receive PW packets with the flow label.

18. An apparatus comprising:
a provider edge (PE) coupled to a second PE and to a customer edge (CE), wherein the PE is configured to:
establish a Virtual Private Local Area Network (LAN) Service (VPLS) that interconnects the PE with the second PE via a pseudowire (PW) that comprises a plurality of paths;
set one or more flags within a flow label indication when the PE is configured to support exchanging a plurality of data packets that each comprise a flow label via the PW;
transmit the flow label indication to the second PE,
wherein the flow label is used to route the data packets via the paths,
wherein the flags indicate whether the PE is configured to support exchanging the data packets with the flow labels via the PW, wherein the PE is further configured to establish a second PW that interconnects the PE with a third PE within the VPLS and transmit a second flow label indication to the third PE, and wherein the second flow indication indicates the PE is not configured to exchange the data packets with the third PE via the second PW.

19. A network component comprising:
a processor configured to set a first flag and a second flag located within a Layer Two (Layer 2) message, wherein the first flag and the second flag are used to determine whether the network component is capable of supporting one or more flow labels transported over a pseudowire (PW) configured for a Layer 2 Virtual Private Network (VPN);
a transmitter coupled to the processor, wherein the transmitter is configured to send a PW packet with the flow label to a peer network component when the first flag is set to indicate that the network component is configured to transmit the PW packet with the flow label via the PW;
a receiver coupled to the processor, wherein the receiver is configured to receive a second PW packet with the flow label when the second flag is set to indicate that the network component is configured to receive the second PW packet with the flow label via the PW,
wherein the flow labels are used to transport the PW packet and the second PW packet over a plurality of data flows within the PW, wherein the transmitter is further configured to transmit the Layer 2 message prior to transmitting the PW packet, wherein a second Layer 2 message comprises a third flag and a fourth flag, wherein the receiver is further configured to receive the second Layer 2 message associated with the PW prior to the receiving the second PW packet, and wherein the receiver is further configured to receive the second PW packet via the PW when the second flag is set and the third flag is set.

20. The network component of claim 19, wherein the processor is further configured to encapsulate the flow label into the PW packet when the first flag is set and the fourth flag is set, and wherein the flow label is used to differentiate the paths within the PW.

* * * * *